Aug. 6, 1968  H. D. CRANDON  3,396,214
METHOD OF MAKING OPTICAL ELEMENTS USING ULTRASONIC VIBRATION
Filed Feb. 2, 1965
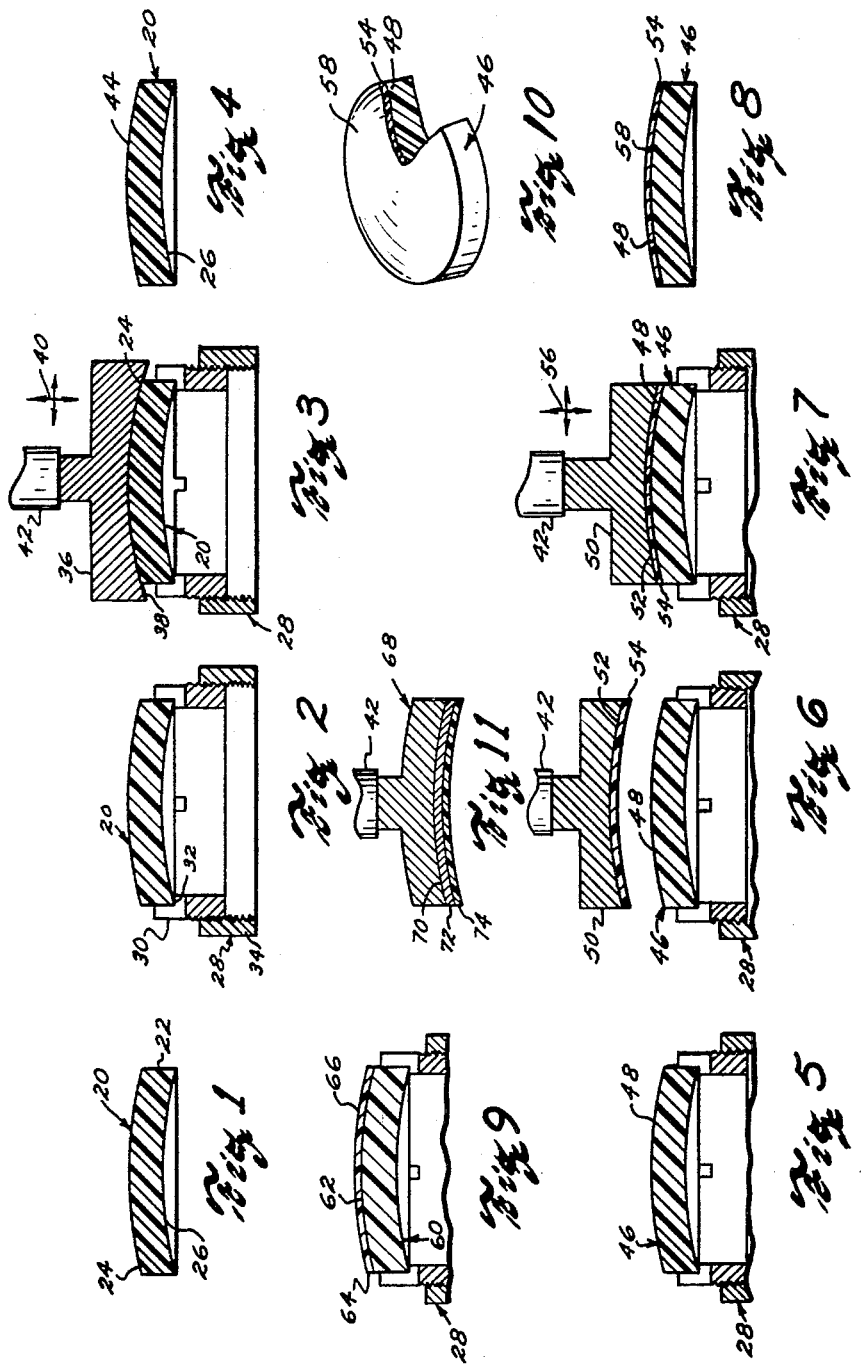
INVENTOR.
HARRY D. CRANDON
BY James P. McAndrews
ATTORNEY United States Patent Office
3,396,214
Patented Aug. 6, 1968

3,396,214
METHOD OF MAKING OPTICAL ELEMENTS USING ULTRASONIC VIBRATION
Harry D. Crandon, Woodstock, Conn., assignor to American Optical Company, Southbridge, Mass., a voluntary association of Massachusetts
Filed Feb. 2, 1965, Ser. No. 429,725
6 Claims. (Cl. 264—1)

ABSTRACT OF THE DISCLOSURE

A method for producing optically finished surfaces on optical components such as lenses, mirrors, prisms and the like with ultrasonic vibration. A master member formed of material having a higher melting temperature than that of the surface of a workpiece to be optically finished is provided with a working surface of precisely the shape and surface finish desired to be produced on the workpiece. The working surface of the master member is pressed against the workpiece and ultrasonically vibrated until the surface of the workpiece assumes precisely the shape and character of finish of the working surface of the master member. The invention contemplates similar working of coated article surfaces with induced fusion of the coatings to the articles and also the transferring of surfacing materials from the master member to workpieces with simultaneous finishing and fusion of the surfacing material to the workpieces.

---

The field of this invention is that of optical elements having optically finished surfaces and the invention relates more particularly to novel and improved methods for forming optical surfaces on optical elements.

Several conventional processes are presently used for forming optical surfaces on optical components but all of the processes tend to be quite expensive or are objectionable for other reasons. For example, optically finished surfaces are usually formed on glass and plastic lens blanks in an abrading process. That is, a lens tool having a surface of selected curvature is rubbed against the surface of a lens blank with an abrasive slurry until the blank surface is abraded to the approximate curvature of the lens tool. This process is then repeated using a different tool and a finer abrasive slurry for polishing and optically finishing the surface. This process is relatively slow and expensive as will be understood. In another process, plastic lenses are sometimes cast with optically finished surfaces but, as the cast plastic leans materials tend to contract on cooling, it is difficult and expensive to cast lenses to the proper surface curvatures. Further, once cast, the lens surface curvatures are usually changed only by the abrading processes noted above. Alternately, plastic lens blanks are sometimes coated with lacquers and the like and are baked to form optically finished surfaces on the lens blanks. Here again however the lens materials tend to contract on cooling so that it is difficult to form surfaces of the desired curvature.

It is an object of this invention to provide novel and improved processes for forming optically finished surfaces on optical components; to provide such processes which can be conveniently and inexpensively employed for forming optically finished lens and mirror surfaces on optical components of glass and plastic materials; and to provide novel and improved processes for forming optically finished coated surfaces on optical components.

Briefly described, the novel and improved processes of this invention for forming optically finished surfaces on optical components include the step of providing an element blank such as a lens or mirror blank of glass or plastic material or the like. This blank has an unfinished surface of selected configuration and preferably has such a surface which is of approximately the selected curvature desired to be formed and optically finished on the component. A master is then provided having a surface of precisely the curvature desired of said optically finished surface. These blank and master surfaces are then engaged and the blank and master are subjected to ultrasonic vibration for forming the optically finished surface on the element blank. Preferably the blank and master surfaces are pressed together and the blank and master are ultrasonically vibrated relative to each other for optically finishing the blank surface to the precise curvature or configuration of the master surface.

In a preferred embodiment of the process of this invention, the element blank is formed of material such as plastic which is fusible at a selected temperature. The master is then formed of another material such as metal or glass which is not fusible at the selected temperature. The blank and master surfaces are then pressed together and are ultrasonically vibrated relative to each other at frequencies of about 20,000 c.p.s. or more for generating sufficient heat at said surfaces to fuse the blank surface into the precise curvature or configuration of the master surface.

In an alternate process of this invention, the element blank surface is coated with a lacquer or the like and the master surface is pressed against the coated blank surface. The blank and master are then ultrasonically vibrated for fusing the lacquer on the blank and for forming an optically finished surface on the blank coating in the configuration or curvature of the master surface.

In other alternate process of this invention, the master surface is coated with a fusible material. The coated master surface and the blank surface are then pressed together and subjected to ultrasonic vibration for transferring the coating to the blank surface and for fusing the coating material to form an optically finished surface thereon in the curvature of the master surface. In this process, aluminum and other light-reflecting materials are transferred to glass and plastic blanks and the like for forming mirrors. Similarly, lacquers and other light-transmitting materials are applied to glass and plastic lens blanks and the like for forming optically finished lens surfaces on the blanks. In another embodiment of this process invention, the master surface is coated with a plastic monomer. The coated master surface is then pressed against a plastic lens blank surface and is ultrasonically vibrated for transferring the coating to the lens blank surface and for polymerizing or copolymerizing the coating material to the lens blank material.

Other objects, advantages and details of the novel and improved optical elements provided by this invention as well as other objects, advantages and details of the processes of this invention appear in the following detailed description of preferred embodiments of the invention, the detailed description referring to the drawings in which:

FIGS. 1–4 are vertical section views through a lens blank illustrating the process of this invention by which an optically finished surface is formed on the lens blank;

FIGS. 5–8 are similar section views illustrating an alternate process according to this invention;

FIG. 9 is a similar section view illustrating another alternate process according to this invention;

FIG. 10 is a perspective view of an optical component provided by the process of this invention; and FIG. 11 is a section view similar to FIG. 6 illustrating another alternate process according to this invention.

Referring to the drawings, 20 in FIG. 1 illustrates a conventional lens blank upon which an optically finished lens surface is to be formed according to the process of this invention. The lens blank preferably embodies a thermoplastic material such as a polymer of methyl methacrylate which is fusible at a relatively low temperature but the blank can also be formed of glass or other fusible material within the scope of this invention. The lens blank can have a generally round perimeter 22 and spherical lens blank surfaces 24 and 26 but lens blanks of other shapes having aspheric lens surface curvatures and the like can also be used. The general shape of the lens blank including the blank surfaces 24 and 26 can be formed by any conventional casting or abrading process or the like as preferred. The blank surface 24 is not optically finished but the curvature of the surface 24 preferably approximates the curvature of the optically finished lens surface to be formed on the lens blank.

The lens blank is preferably mounted in a conventional chuck as illustrated at 28 in FIG. 2 for rigidly supporting the blank with the blank surface 24 in an accessible position. For example, the chuck mechanism can include a split, threaded sleeve 30 having a shoulder 32 on which the lens blank rests and can include a clamping ring 34 threadedly engaged on the sleeve for tightening the split sleeve around the lens blank in conventional manner. Of course any other conventional means for mounting the lens blank to give access to the blank surface 24 can also be employed.

A master or tool 36 is then provided which has a surface 38 precisely corresponding in curvature to the optically finished lens surface to be formed on the lens blank 20. The master is preferably formed of glass which is not fusible at the low fusing temperature of the blank material, the glass master surface 38 optically finished to a high degree of accuracy. Of course masters formed of other plastic or metal materials or the like can also be used provided that the master materials are not fusible at the relatively lower fusing temperature of the selected lens blank material.

In accordance with this invention, the master surface 38 and the lens blank surface 24 are pressed together. The master and lens blank are then subjected to ultrasonic vibration as is diagrammatically indicated by the arrow 40 in FIG. 3. Any conventional ultrasonic vibrating means diagrammatically indicated by the vibrating horn 42 in FIG. 3 can be employed for vibrating the master and lens blank relative to each other but preferably the ultrasonic vibrating means is adapted to vibrate the blank and master at frequencies on the order of 20,000 cycles per second or more. When this is done, heat is very rapidly generated at the interface between the master and lens blank so that a very thin layer of the lens blank material at the blank surface 24 is heated to the fusing temperature of the blank material and assumes the precise curvature or configuration of the master surface 38. This fusing and forming of the lens blank surface occurs in a very brief period of time after which the master is withdrawn from its engagement with the lens blank leaving a lens surface 44 on the lens blank as shown in FIG. 4. This lens surface is optically finished to the precise curvature desired on the lens blank 20. As only a very thin layer of the lens blank material is heated to fusing temperature in the course of forming this optically finished surface 44, no significant contraction of the lens blank occurs during cooling of the blank surface layer and the precise curvature of the lens blank surface 44 is not significantly changed during the cooling. It will be understood that the lens blank surface 26 can be optically finished in the same manner as above described. Similarly it can be seen that other surfaces of other optical components such as prisms, mirrors and the like can also be optically finished according to the process of this invention.

In an alternate process according to this invention, a similar lens blank 46 or the like is mounted in the chuck mechanism 28 with the lens blank surface 48 supported in an accessible position as shown in FIG. 5. A similar master or tool 50 is then provided which has a surface 52 of precisely the curvature desired to be formed and optically finished on the lens blank 46. A coating 54 of a fusible material such as a polymer of methyl methacrylate or the like is then applied to the master surface 52 by spraying or other conventional means as shown in FIG. 6. The coated master surface 52 and the lens blank surface 48 are then pressed together as shown in FIG. 7 and are subjected to ultrasonic vibration by means of the horn 42 as indicated by the arrow 56 in FIG. 7. When this is done, heat is very rapidly generated at the interface of the coated master surface and the lens blank surface for heating the master coating 54 to its fusing temperature. The coating 54 then transfers to the lens blank surface 48 and is fused to form a layer having an optically finished surface 58 thereon in the precise curvature of the master surface 52 as shown in FIG. 8. The finished optical component formed by this process is illustrated in FIG. 10. This process is useful in forming optically finished surfaces on optical components of various types within the scope of this invention. For example, the coating material 54 can comprise a fusible, light-transmitting, plastic material such as a polymer of methyl methacrylate and can be transferred to a plastic lens blank of allyl diglycol carbonate as indicated in FIGS. 5–8 for forming a lens.

In another alternate process, the coating 54 on the master 50 shown in FIG. 6 embodies a polymer of methyl methacrylate monomer and the lens blank 46 embodies polymerized methyl methacrylate. When the coated master surface 52 and the lens blank surface 48 are pressed together, the master and lens blank can be subjected to ultrasonic vibration as indicated in FIG. 7 for rapidly generating heat at the interface between the master and lens blank. When this is done, the coating 54 is transferred from the master to the lens blank and is polymerized to the lens blank material by the generated heat. The coating retains the configuration of the master surface 52 for forming the optically finished lens surface 58 on the lens blank 46 as will be understood. In this way an inexpensively formed lens blank can be economically provided with an optically finished surface. Of course where the material of the plastic coating comprises allyl diglycol carbonate and the lens blank embodies a different plastic material such as methyl methacrylate for example, the coating and lens blank material can be copolymerized by heat which is ultrasonically generated in the manner described above. In this way an inexpensively formed blank can be economically provided with an abrasion-resistant surface. Of course other types of low-reflecting surfaces and the like can also be formed on lens blanks in this manner.

In another alternate process according to this invention, a similar lens blank 60 is mounted in the chuck mechanism 28 as shown in FIG. 9. This blank also has a blank surface 62 which is not optically finished but which is of approximately the curvature desired of the optically finished surface to be formed on the lens blank. In this process, the lens blank surface 62 is coated with a fusible material 64 such as a heat-convertible lacquer such as a phenolic, alkyd or baking-type vinyl lacquer or the like by spraying or other conventional means. This coated lens blank is then processed in a manner similar to that described above with reference to the lens blanks 20 and 46. That is, the coated lens blank surface is pressed together with the precisely curved surface of a master and is ultrasonically vibrated as described above with reference to FIGS. 3 and 7 so that the blank surface coating is fused to the lens blank to form an optically finished surface thereon at 66 in the precise curvature of the master surface as will be understood.

In another alternate process of this invention, a similar master tool 68 having an optically finished surface 70 is coated with a layer 72 of light-reflecting material such as aluminum and is then coated with a second layer 74 of fusible plastic material. This coated master is then processed in a manner similar to that described above with reference to FIGS. 6–8. That is the coated master is pressed against a selected plastic blank surface having approximately the curvature of the master surface 70 and the master is ultrasonically vibrated as described above with reference to FIG. 7. When this is done the second master 74 is fused and transferred to the plastic blank together with the light-reflecting layer 72 to form an optically finished mirror surface on the plastic blank as will be understood.

It can be seen that the processes of this invention can be used very economically for forming optically finished surfaces of selected curvature on all sorts of optical components such as lenses, prisms, mirrors and the like. In this regard, it will be appreciated that the component or element blanks used in these processes can be very inexpensive in that the surfaces of the blanks need only approximate the curvatures of the optically finished surfaces to be formed on the blanks. Further, the process of optically finishing the blank surface is simple, direct and rapidly accomplished. In addition, the processes have a wide utility in that they can be used to form surfaces of any desired curvature or configuration including spherical and aspherical surfaces and can conveniently form such surfaces at a variety of locations on an element blank. Most important, the processes permit the formation of lenses and the like of more than one material so that the desirable characteristics of different materials can be advantageously combined in single components. For example, light-weight lens blank materials and the like can be easily surfaced with other materials which are harder, more chemical resistant, less reflective or the like as will be understood.

It should be understood that although particular embodiments of this invention are described for purposes of illustration, this invention includes all modifications and equivalents thereof which fall within the scope of the appended claims.

I claim:

1. A method for forming an optical surface on an optical element comprising the steps of providing an element blank having a surface of selected configuration approximating that desired of said optically finished surface, providing a master having a surface of the precise configuration and optical finish desired for said optical surface, pressing said blank and master surfaces together and subjecting said blank and master to ultrasonic vibration for a period of time sufficient to cause said surface of selected configuration to assume the configuration and finish of said master surface whereby said optical surface is formed on said element blank.

2. The method according to claim 1 wherein said master is formed of a material which is heat softenable at a temperature substantially higher than the material of said element blank.

3. The method according to claim 2 wherein said blank surface is coated with a material which is fusible thereto at a temperature substantially below that at which said master is heat softenable whereby said optical surface is formed of said coating and said coating is fused to said blank surface by said pressing together and ultrasonic vibration of said blank and master.

4. The method according to claim 2 wherein said master surface is coated with a material which is fusible to said blank surface at a temperature substantially below that at which said master is heat softenable whereby said optical surface is formed of said coating and said coating is fused to said blank surface by said pressing together and ultrasonic vibration of said blank and master.

5. The method according to claim 3 wherein said coating is provided with outwardly disposed light-reflecting material and said resulting optical surface is reflective to light.

6. The method according to claim 4 wherein said coating is provided with an inwardly disposed light-reflecting material against said master surface and said resulting optical surface is reflective to light.

References Cited

UNITED STATES PATENTS

| 2,339,433 | 11/1944 | Staehle | 264—1 |
| 2,408,540 | 10/1946 | Williams | 264—1 |
| 2,473,588 | 6/1949 | Johnson | 264—1 |
| 2,479,935 | 8/1949 | Johnson | 264—1 |
| 2,635,289 | 4/1953 | Owens | 264—1 |
| 3,224,916 | 12/1965 | Soloff et al. | 264—23 |

JAMES A. SEIDLECK, *Primary Examiner.*

A. H. KOECKERT, *Assistant Examiner.*